United States Patent
Chai et al.

(10) Patent No.: US 12,367,640 B2
(45) Date of Patent: Jul. 22, 2025

(54) VIRTUAL ROLE-BASED MULTIMODAL INTERACTION METHOD, APPARATUS AND SYSTEM, STORAGE MEDIUM, AND TERMINAL

(71) Applicants: MOFA (SHANGHAI) INFORMATION TECHNOLOGY CO., LTD., Shanghai (CN); SHANGHAI MOVU TECHNOLOGY CO., LTD., Shanghai (CN)

(72) Inventors: Jinxiang Chai, Shanghai (CN); Hongbing Tan, Shanghai (CN); Xingtang Xiong, Shanghai (CN); Congyi Wang, Shanghai (CN); Zhiqiang Liang, Shanghai (CN); Bin Wang, Shanghai (CN); Yu Chen, Shanghai (CN)

(73) Assignees: MOFA (SHANGHAI) INFORMATION TECHNOLOGY CO., LTD., Shanghai (CN); SHANGHAI MOVU TECHNOLOGY CO., LTD., Shanghai (CN)

( * ) Notice: Subject to any disclaimer, the term of this patent is extended or adjusted under 35 U.S.C. 154(b) by 236 days.

(21) Appl. No.: 18/024,035

(22) PCT Filed: Aug. 9, 2021

(86) PCT No.: PCT/CN2021/111422
§ 371 (c)(1),
(2) Date: Feb. 28, 2023

(87) PCT Pub. No.: WO2022/048403
PCT Pub. Date: Mar. 10, 2022

(65) Prior Publication Data
US 2023/0316643 A1    Oct. 5, 2023

(30) Foreign Application Priority Data

Sep. 1, 2020    (CN) .................... 202010906582.5

(51) Int. Cl.
*G06T 17/00*         (2006.01)
*G06T 13/40*         (2011.01)
(Continued)

(52) U.S. Cl.
CPC .............. *G06T 17/00* (2013.01); *G06T 13/40* (2013.01); *G06V 40/171* (2022.01);
(Continued)

(58) Field of Classification Search
CPC ....... G06T 17/00; G06T 13/40; G06T 13/205; G06T 15/005; G06T 19/006; G06T 7/70;
(Continued)

(56) References Cited

U.S. PATENT DOCUMENTS

2006/0277466 A1    12/2006    Anderson
2020/0043491 A1    2/2020    Lee et al.
(Continued)

FOREIGN PATENT DOCUMENTS

CN    105345818 A    2/2016
CN    107340859 A    11/2017
(Continued)

OTHER PUBLICATIONS

International Search Report mailed Nov. 9, 2021 for PCT/CN2021/111422 (five (5) pages).
(Continued)

*Primary Examiner* — Xilin Guo
(74) *Attorney, Agent, or Firm* — KDW FIRM PLLC (57) ABSTRACT

A virtual role-based multimodal interaction method, apparatus and system, a storage medium, and a terminal, where the method includes: acquiring input information, where the
(Continued)

input information includes one or more data types; inputting the input information into a perception layer to enable the perception layer to recognize and process the input information according to a data type of the input information to obtain a recognition result; inputting the recognition result into a logic decision-making layer to enable the logic decision-making layer to process the recognition result and generate a drive instruction corresponding to the recognition result; acquiring multimodal virtual content according to the drive instruction, wherein the multimodal virtual content includes at least a virtual role; and outputting the acquired multimodal virtual content.

20 Claims, 5 Drawing Sheets

(51) Int. Cl.
  *G06V 40/16* (2022.01)
  *G06V 40/18* (2022.01)
  *G06V 40/20* (2022.01)
(52) U.S. Cl.
  CPC .......... *G06V 40/174* (2022.01); *G06V 40/193* (2022.01); *G06V 40/20* (2022.01)
(58) Field of Classification Search
  CPC ...... G06T 7/20; G06V 40/171; G06V 40/174; G06V 40/193; G06V 40/20; G06V 40/161; G06V 10/82; G06V 10/40; G10L 13/00; G06F 3/011; G06F 2203/011; G06F 2203/012; G06F 3/017; G06N 3/045; G06N 3/08
  See application file for complete search history.

(56) References Cited

U.S. PATENT DOCUMENTS

| 2021/0120206 A1* | 4/2021 | Liu | G06F 9/547 |
| 2022/0207872 A1* | 6/2022 | Ren | G06N 3/044 |

FOREIGN PATENT DOCUMENTS

| CN | 107765852 A | 3/2018 |
| CN | 107894833 A | 4/2018 |
| CN | 110070944 A | 7/2019 |
| CN | 110647636 A | 1/2020 |
| CN | 112162628 A | 1/2021 |
| IN | 107894831 A | 4/2018 |

OTHER PUBLICATIONS

First Office Action dated Jun. 8, 2021 for Chinese Patent Application No. 202010906582.5 (14 pages).
Second Office Action dated Aug. 3, 2021 for Chinese Patent Application No. 202010906582.5 (15 pages).

* cited by examiner

VIRTUAL ROLE-BASED MULTIMODAL INTERACTION METHOD, APPARATUS AND SYSTEM, STORAGE MEDIUM, AND TERMINAL

CROSS-REFERENCE TO RELATED APPLICATIONS

This is a National Stage Application filed under 35 U.S.C. 371 based on International Patent Application No. PCT/CN2021/111422, filed on Aug. 9, 2021, which claims priority to Chinese Patent Application No. 202010906582.5 filed on Sep. 1, 2020, the disclosures of both of which are incorporated herein by reference in their entireties.

TECHNICAL FIELD

The present disclosure relates to the field of virtual roles and specifically to a virtual role-based multimodal interaction method, apparatus and system, a storage medium, and a terminal.

BACKGROUND

In recent years, with the rapid development of artificial intelligence technology and applications, the use of conversational interaction intelligent assistants in smart phones, smart homes, banks, governments and other industry architectures is becoming more and more popular. For example, on the consumer side (that is, the enterprise client), smart voice assistants have been integrated into various products such as smart phones, smart speakers and smart televisions. In addition, on the business side (that is, the consumer client), there are numerous practice scenarios of intelligent assistants, such as E-commerce customer service robots, bank reception robots, education robots and exhibition hall consultation robots.

However, current intelligent assistants have many problems, mainly including low information acquisition efficiency and poor interaction experience. Such problems are embodied as follows:

(1) Low information acquisition efficiency: When users search or inquire about information by means of existing intelligent assistants or information applications (APPs) and websites, the users cannot acquire the required information timely but must screen out the required information from a wide range of information, causing the low information acquisition efficiency.

(2) Poor interaction experience: The existing intelligent assistants achieve interaction mainly through text and speech, and such interaction is basically text or speech unimodal interaction or text and speech bimodal interaction. Few input modalities can be supported, and generally only two input modalities, speech and text, are supported. The artificial intelligence (AI) brain of the logic decision-making module cannot process complex situations. For example, the dialogue system module can only process simple question answering and explicit task instructions, and when complex question answering occurs, the dialogue system module often gives an irrelevant answer or fails to provide required information. When the existing intelligent assistants are used, the output information is in a single form and is mainly outputted through the combination of text and speech or presented in the form of conventional information such as pictures, causing the presentation manner to be rigid. The above-mentioned situations of the existing intelligent assistants lead to poor interaction experience between users and intelligent assistants.

SUMMARY

The technical problem to be solved by the present disclosure is how to improve the information acquisition efficiency of the intelligent assistant and improve the user interaction experience.

In order to solve the preceding technical problem, embodiments of the present disclosure provide a virtual role-based multimodal interaction method. The method includes the following steps: input information is acquired, where the input information includes one or more data types; the input information is inputted into a perception layer to enable the perception layer to recognize and process the input information according to the data type of the input information to obtain a recognition result; the recognition result is inputted into a logic decision-making layer to enable the logic decision-making layer to process the recognition result and generate a drive instruction corresponding to the recognition result; multimodal virtual content is acquired according to the drive instruction, where the multimodal virtual content includes at least a virtual role; and the acquired multimodal virtual content is outputted.

Optionally, the logic decision-making layer includes a logic decision-making model, the logic decision-making model is trained based on training samples, the training samples are samples of the recognition result and samples of the drive instruction, and the training samples include a training set and a test set.

Optionally, the multimodal virtual content further includes one or more of a virtual scene, a virtual information control, a virtual special effect or a virtual prop.

Optionally, the input information at least includes text data, audio data and image data.

Optionally, the perception layer performs information recognition on the input information through one or more of a speech recognition processing technology, a text recognition technology or an image recognition technology.

Optionally, when the perception layer performs information recognition on the input information through the speech recognition processing technology, the audio data in the input information is inputted into a speech recognition model to obtain a corresponding recognition result.

Optionally, when the perception layer performs information recognition on the input information through the image recognition processing technology, at least face information, gesture information, facial expression information, facial emotion information and an object type included in an image in the image data of the input information are recognized.

Optionally, the recognition result is semantic information corresponding to a plurality of data types, and the step where the recognition result is inputted into the logic decision-making layer to enable the logic decision-making layer to process the recognition result and generate the drive instruction corresponding to the recognition result further includes: the semantic information corresponding to the plurality of data types is inputted into a natural language conversational system to obtain the drive instruction.

Optionally, the multimodal virtual content includes virtual content of the virtual role and other virtual content other than the virtual role, and after the drive instruction is obtained, the method further includes: an output text and/or a display instruction is acquired from the drive instruction through a routing module, where the output text is used for acquiring the virtual content of the virtual role, and the display instruction is used for acquiring the other virtual content other than the virtual role.

Optionally, the method further includes the generation of the virtual role and a material library, and the generation of the virtual role and a material library includes: the virtual role is generated through one or more of a face scanning technology, a face intelligent modeling technology, a face intelligent binding technology, a body intelligent modeling technology or a body intelligent binding technology; action animation data of the virtual role is collected through a motion capture technology and/or a motion retargeting technology to obtain a body action material of the virtual role; expression animation data of the virtual role is collected through an expression and/or eye capture technology and an expression and eye transfer technology to obtain an expression action material of the virtual role; a training text and a training speech are acquired; and model training is performed with the training text, the training speech and the expression action material as training samples to obtain a speech animation synthesis model.

Optionally, the step where the multimodal virtual content is acquired according to the drive instruction includes: an output speech and/or an expression action corresponding to the virtual role are acquired based on the output text through the speech animation synthesis model.

Optionally, the expression action of the virtual role includes a lip shape.

Optionally, the step where the multimodal virtual content is acquired according to the drive instruction includes: a body action corresponding to the virtual role is acquired from the body action material based on the output text.

Optionally, the step where the multimodal virtual content is acquired according to the drive instruction further includes: one or more of a virtual scene, a virtual information control, a virtual special effect or a virtual prop is acquired based on the display instruction.

Optionally, the step where the acquired multimodal virtual content is outputted includes: animation data is generated according to the acquired multimodal virtual content, and the animation data is outputted according to a time sequence with speech content as a timeline.

Optionally, after the animation data is generated according to the acquired multimodal virtual content, the method further includes: real-time resolving and/or real-time rendering are performed on the animation data to obtain a video and output the video.

Optionally, the simulation of a physical behavior of an object in a real scene is performed on the animation data through a resolving algorithm.

Optionally, the input information is collected by an information collection device, and the information collection device includes one or more of a text collection device, an image collection device, a sound pick-up device, a temperature sensor or a gyroscope.

The embodiments of the present disclosure further provide a virtual role-based multimodal interaction apparatus. The apparatus includes: an input information acquisition module configured to acquire input information, where the input information includes one or more data types; a perception layer processing module configured to input the input information into a perception layer to enable the perception layer to recognize and process the input information according to the data type of the input information to obtain a recognition result; a logic decision-making layer processing module configured to input the recognition result into a logic decision-making layer to enable the logic decision-making layer to process the recognition result and generate a drive instruction corresponding to the recognition result; a virtual content acquisition module configured to acquire multimodal virtual content according to the drive instruction, where the multimodal virtual content includes at least a virtual role; and an output module configured to output the acquired multimodal virtual content.

The embodiments of the present disclosure further provide a storage medium having a computer program stored thereon, where the computer program, when executed by a processor, performs steps of any one of the methods described above.

The embodiments of the present disclosure further provide a terminal including a memory and a processor, where the memory is configured to store a computer program, and the processor, when executing the computer program, performs steps of any one of the methods described above.

The embodiments of the present disclosure further provide a virtual role-based multimodal interaction system including an information collection device, a platform and an output device, where the information collection device is configured to collect external data to obtain input information; the platform is configured to perform any one of the methods described above; and the output device is configured to display outputted multimodal virtual content.

Compared with the existing art, the technical solutions of the embodiments of the present disclosure have the beneficial effects below.

Compared with the existing art, the virtual role-based multimodal interaction method provided by the embodiments of the present disclosure can recognize and process input information of various data types, improving the information processing capability; and the outputted multimodal virtual content can combine various responses of the virtual role (for example, making actions, giving expressions and speaking statements) and combine virtual scenes, virtual information controls, virtual special effects and virtual props, causing the outputted virtual content to be more intuitive and colorful and providing users with better experience in the interaction with intelligent assistants.

Further, the logic decision-making layer quickly analyzes the recognition result based on the trained logic decision-making model to generate the drive instruction for driving the virtual role. Therefore, the driving efficiency can be improved, and the factors for which the recognition results of various input information affect each other are considered so that the processing of the platform is more intelligent, further improving the user interaction experience.

Further, the recognition results corresponding to various input information are converted into semantic information, and a natural language conversational system is deployed in the logic decision-making layer and can generate the drive instruction based on semantic information corresponding to various data types.

Further, the virtual role and its material library can be generated offline before a platform executes the virtual role-based multimodal interaction method, and when the platform displays multimodal virtual content, the virtual role can make expression actions and/or body actions highly aligned with the sound when the virtual role outputs speech so that the virtual role can speak as naturally as a real person, improving the intelligence and realism of the virtual role. Further, when the multimodal output layer outputs animation data, every frame image of the outputted animation data is solved and rendered in real time through the solution technology and rendering technology of a real-time engine, and in the virtual high-quality 3D scene, the virtual role can express itself through eyes, expressions, actions and conversations, thereby achieving realistic real-time communication effects.

DETAILED DESCRIPTION

As stated in the background, the intelligent assistant in the existing art has problems of low information acquisition efficiency and poor interaction experience.

In order to solve the preceding problems, the embodiments of the present disclosure provide a virtual role-based multimodal interaction method, apparatus and system, a storage medium, and a terminal. The virtual role-based multimodal interaction method includes the following steps: input information is acquired, where the input information includes one or more data types; the input information is inputted into a perception layer to enable the perception layer to recognize and process the input information according to the data type of the input information to obtain a recognition result; the recognition result is inputted into a logic decision-making layer to enable the logic decision-making layer to process the recognition result and generate a drive instruction corresponding to the recognition result; multimodal virtual content is acquired according to the drive instruction, where the multimodal virtual content includes at least a virtual role; and the acquired multimodal virtual content is outputted.

Through the preceding solution, the information acquisition efficiency can be improved, and the multimodal virtual content can be outputted, thereby improving the user interaction experience.

The object, features and beneficial effects of the present disclosure will be more apparent from the detailed description of the embodiments of the present disclosure in conjunction with the drawings.

Figure 1:
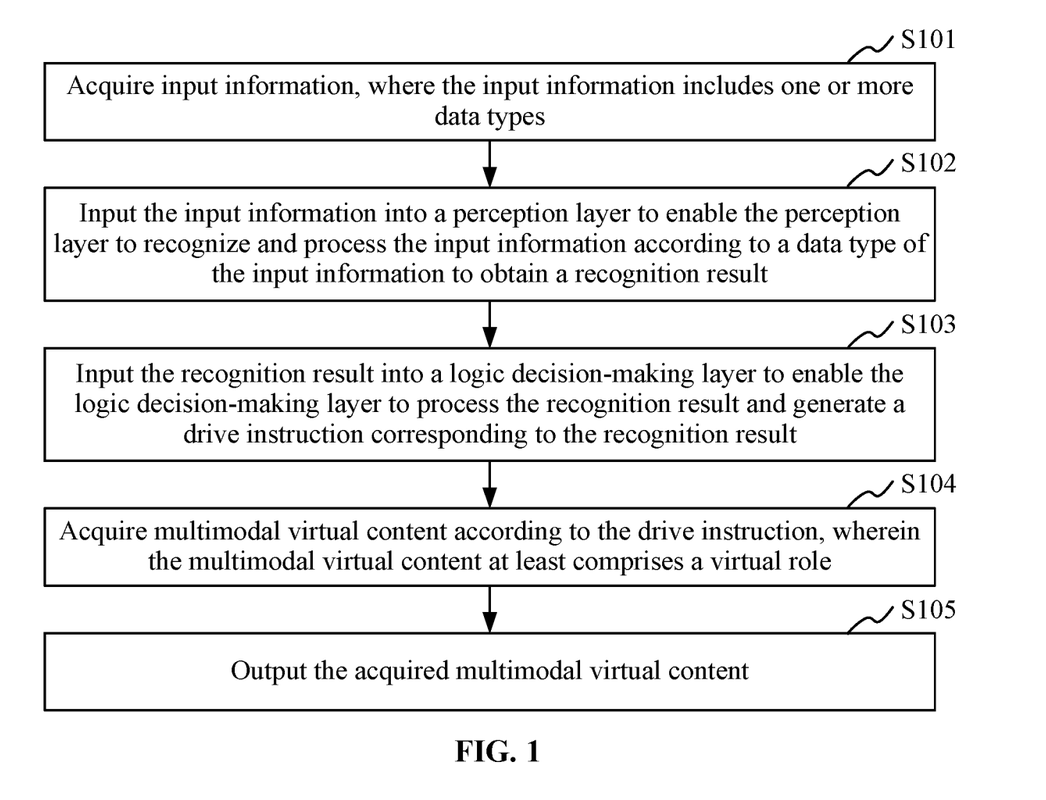
FIG. 1 is a flowchart of a virtual role-based multimodal interaction method according to an embodiment of the present disclosure.

With reference to FIG. 1, the embodiments of the present disclosure provide a virtual role-based multimodal interaction method, where the virtual role may be an intelligent assistant, and the virtual role may be a virtual digital human, a virtual anime character, a cartoon two-dimensional character or other animation images. The virtual role may be a two-dimensional (2D) object or a three-dimensional (3D) object. In particular, the virtual role may be a virtual digital human, that is, the virtual role is presented in the form of a human, and at the stage of offline production, the 3D modeling may be performed based on the real human to improve the realism of the generated virtual role. The virtual role-based multimodal interaction method may specifically include steps S101 to S105.

In step S101, input information is acquired, where the input information includes one or more data types.

The input information is information inputted to a platform that executes the virtual role-based multimodal interaction method. The input end of the platform can support external data of various data types, at least including text data, audio data and image data, support other data types as needed, and thus support input information of at least text, audio, image and other data types.

Optionally, the input information may be classified into other data types according to requirements, such as temperature data, infrared data, angle data and gravity data.

Optionally, the input information may be collected by an information collection device, and the information collection device includes one or more of a text collection device, an image collection device, a sound pick-up device, a temperature sensor or a gyroscope.

Optionally, the text information inputted externally is acquired through a text collection device such as a text box.

Specifically, an external real-time speech audio stream or a recording file may be acquired through a sound pick-up device such as a microphone array. The sound pick-up device may also perform pre-processing operations on the acquired audio, such as echo cancellation, noise suppression and other operations, to obtain a segment of high-quality audio data.

External image data may be acquired through an image collection device (such as a high-definition television camera and other collection devices), and the image data may include, for example, face information, gesture information, facial expression information, facial emotion information and other image data. Image collection is performed on faces and gestures, and such information may be taken as the reference for subsequent recognition of image data.

The collection of other data of different dimensions may also be supported through other different collection devices. For example, ambient temperature information is acquired through a temperature sensor, and angle information of a device is acquired through a gyroscope. In addition, the information required for services may also be collected according to different service scenarios. For example, in a medical scenario, the electroencephalogram information may be acquired by an electroencephalogram device.

It is to be noted that the information collection device includes, but is not limited to, the devices enumerated above, and may include a keyboard, a mouse, a touch screen or other devices capable of providing input information to a terminal.

In step S102, the input information is inputted into a perception layer to enable the perception layer to recognize and process the input information according to the data type of the input information to obtain a recognition result.

Specifically, when the perception layer performs information recognition on the input information, information recognition may be performed on the input information of various data types based on the carrying modes of the information of various data types to obtain recognition results of various data types.

Optionally, the perception layer performs information recognition on the input information through one or more of a speech recognition processing technology, a text recognition technology or an image recognition technology.

The speech recognition technology can perform information recognition on audio input information to obtain the recognition result of the audio input information. The text recognition technology can perform information recognition on text input information to obtain the recognition result of the text input information. The image recognition technology can perform information recognition on image input information to obtain the recognition result of the image input information.

Optionally, when the perception layer performs information recognition on the input information through the speech recognition processing technology, the audio data in the input information is inputted into a speech recognition model to obtain a corresponding recognition result.

The real-time speech audio stream and the recording file collected through the sound pick-up device may be directly inputted into the speech recognition model for recognition. Audio data may also be obtained after the sound pick-up device performs pre-processing, and then the audio data is inputted into the speech recognition model for recognition. The speech recognition model recognizes the content of the inputted audio data (or file). Optionally, the speech recognition model may include modules such as an audio filtering module, a speech segmentation module, a feature extraction module, an acoustic model module, a language model module and a decoder.

Optionally, when the perception layer performs information recognition on the input information through the image recognition processing technology, at least face information, gesture information, facial expression information, facial emotion information and an object type included in an image in the image data of the input information are recognized.

The preceding information may be recognized by an image processing module, and the image processing module may include functions such as face recognition, facial emotion recognition, gesture recognition and object recognition. The face information in the image may be recognized through face recognition, the emotion of a character in the image may be recognized through facial emotion recognition, the gesture in the image may be recognized through gesture recognition, the object type included in the image may be recognized through the pre-trained object type recognition ability, and finally, the recognition result of the image data is outputted.

Optionally, one or more models may also be deployed in the perception layer to recognize the input information. For example, a model for image recognition or a model for speech recognition may be included, such models may be trained based on samples, and the training samples may be pictures or speech collected based on the application scenarios of the present disclosure, thereby improving recognition accuracy in practical application.

In addition, the perception layer may process the result obtained by the recognition of the input information of various data types, take the processed content as the recognition result, and send the recognition result to the logic decision-making layer in step S103.

In step S103, the recognition result is inputted into a logic decision-making layer to enable the logic decision-making layer to process the recognition result and generate a drive instruction corresponding to the recognition result.

In step S104, multimodal virtual content is acquired according to the drive instruction, where the multimodal virtual content includes at least a virtual role.

In step S105, the acquired multimodal virtual content is outputted.

The data processing logic, preference logic, transition logic and combinatory logic may be deployed in the logic decision-making layer, and the logic decision-making layer also has the logic of obtaining a drive instruction based on the recognition result of input information. The logic decision-making layer generates a drive instruction based on the recognition result according to the logic deployed in the logic decision-making layer, and the output end may invoke a virtual role, a virtual information control, a virtual special effect and a virtual prop based on the drive instruction to obtain and output the to-be-displayed multimodal virtual content. The virtual role may be generated through offline modeling.

The displayed multimodal virtual content may be responses to control the virtual role as indicated by the drive instruction, for example making natural smooth actions, making realistic expressions and speaking statements with the same height as the voice of the real person, the transformation of realistic 3D scenes, the display of pictures, words, special effects and props, or a combination of these responses.

Optionally, the multimodal virtual content further includes one or more of a virtual scene, a virtual information control, a virtual special effect or a virtual prop.

Specifically, a high-quality virtual background (such as a 2D scene, a 3D scene or a virtual reality scene) may be created to carry the virtual role. At the same time, in the process where the virtual role outputs speech, various virtual information controls (widgets) such as pictures, videos, charts and other information are displayed, and preset virtual special effects (such as flames, fireworks and other special effects) and virtual props (such as small blackboard display) are inserted. Of course, more types of multimodal virtual content may be created as needed, including but not limited to the preceding examples.

Through the preceding virtual role-based multimodal interaction method, the input information of various data types can be recognized and processed, improving the information processing capability; and the outputted multimodal virtual content can combine various responses of the virtual role (for example, making actions, giving expressions, and speaking statements) and combine virtual scenes, virtual information controls, virtual special effects and virtual props, causing the outputted virtual content to be more intuitive and colorful and providing users with better experience in the interaction with intelligent assistants.

In an embodiment, the logic decision-making layer includes a logic decision-making model, the logic decision-making model is trained based on training samples, the training samples are samples of the recognition result and samples of the drive instruction, and the training samples include a training set and a test set.

Specifically, the logic decision-making layer includes a logic decision-making model, and the logic decision-making model may generate a drive instruction based on recognition results corresponding to various data types. The recognition results obtained after the perception layer recognizes the input information of different data types in step S102 may be the same data type. For example, all the recognition results are semantic information (also referred to as text data). The logic decision-making model is generated based on the training of samples, and the training samples are the samples corresponding to the recognition result and the samples corresponding to the drive instruction. The model training based on the training samples enables the logic decision-making model to learn the ability corresponding to the drive instruction based on the recognition result of the input information.

Optionally, the training samples may be collected and acquired by technicians and may include the combination of collected information historically searched and inquired by the user on websites. That is, the information of other search or inquiry websites is taken as the training samples of the logic decision-making model to enrich the number of samples, and the information of these search or inquiry websites is real data. Therefore, the practicability of the trained logic decision-making model becomes better so that the drive instruction finally transmitted to the virtual role is more intelligent, thereby improving the user interaction experience.

Optionally, the training samples include a training set and a test set, the training set is used for training a model, and the test set is used for verifying the effect of the model and optimizing the model.

In an embodiment, the logic decision-making layer quickly analyzes the recognition result based on the trained logic decision-making model to generate the drive instruction for driving the virtual role. Therefore, the driving efficiency can be improved, and the factors for which the recognition results of various input information affect each other are considered so that the processing of the platform is more intelligent, further improving the user interaction experience.

In an embodiment, the recognition result is semantic information corresponding to various data types, and the step S103 where the recognition result is inputted into the logic decision-making layer to enable the logic decision-making layer to process the recognition result and generate the drive instruction corresponding to the recognition result in FIG. 1 further includes: the semantic information corresponding to various data types is inputted into a natural language conversational system to obtain the drive instruction corresponding to the recognition result.

In this embodiment, the recognition results corresponding to various input information are converted into semantic information, that is, the semantic information corresponding to various data types. The natural language conversational system is deployed at the logic decision-making layer for generating the drive instruction based on the semantic information corresponding to various data types.

The natural language conversational system is used for conversing with users, and the natural language conversational system may include natural language processing (NLP), natural language understanding (NLU), natural language generation (NLG) and dialog management (DM).

The NLP is mainly used for processing the semantic information corresponding to various input data types, supporting a computer in performing understanding on the semantic information (that is, NLU), and also supporting the generation of corresponding text instruction information (that is, NLG).

The NLU converts semantic information into machine-intelligible, structured and complete semantic representations, including analysis, part-of-speech tagging, syntactic-semantic analysis, information extraction, text mining, machine translation, information retrieval and text proofreading.

The DM is mainly used for conversation management, that is, the DM plays the role of connecting NLU and NLG, including controlling the process of the man-machine conversation, and the DM system determines the reaction to the user at this moment according to the conversation history information. The conversation type mainly includes chat, question answering management and task-based dialogue. The main tasks of the dialogue management include dialogue status maintenance and system decision generation.

The NLG aims to enable a machine to generate texts in the form of natural language that human beings can understand according to certain structured data, texts, audio and video. The NLG is mainly divided into the following three categories: A. text-to-text NLG, which mainly processes the inputted natural language text; B. data-to-text NLG, which mainly generates readable and intelligible natural language texts according to the inputted structured data; and C. vision-to-text NLG, which is mainly to, based on a given picture or video, generate natural language texts that can accurately describe the semantic information of the picture or video (actually continuous picture sequences).

The natural language conversational system outputs a result through the NLP capability and the decision-making of the NLU, DM and NLG, and the result is a drive instruction for driving the subsequent multimodal output content.

Optionally, a knowledge map may also be deployed at the logic decision-making layer. The knowledge map may be understood as the knowledge base of a semantic network, is a structured representation of facts, and is composed of entities, relationships and semantic descriptions. The knowledge map is the underlying technology of NLP, NLU, NLG and DM for supporting the natural language conversational system.

In an embodiment, the multimodal virtual content includes virtual content of the virtual role and other virtual content other than the virtual role, and after the drive instruction is obtained, the method further includes: an output text and/or a display instruction is acquired from the drive instruction through a routing module, where the output text is used for acquiring the virtual content of the virtual role, and the display instruction is used for acquiring the other virtual content other than the virtual role.

The drive instruction may include an output text. The output text is the content to be outputted by the virtual role, that is, the virtual content related to the virtual role, which is also called the virtual content of the virtual role, and includes the related actions that the virtual role displays and the speech that the virtual role plays and outputs. The virtual content outputted by the virtual role is mainly determined by the output text. The drive instruction may further include a display instruction for determining other virtual content (virtual scenes, virtual information controls, virtual special effects and virtual props) other than the virtual role, and the display instructions may be multiple for acquiring different other virtual content.

The specific split of the drive instruction into the output text and one or more display instructions is controlled by a routing module. The routing module is further configured to forward the split output text and display instructions to different modules to obtain the multimodal virtual content from these modules.

In an embodiment, with continued reference to FIG. 1, the step S104 where the multimodal virtual content is acquired according to the drive instruction includes: the drive instruction is inputted into a multimodal output layer to enable the multimodal output layer to invoke the multimodal virtual content and drive the display and output of the multimodal virtual content based on the drive instruction.

The multimodal output layer is configured with virtual roles which have been produced and the association relationship between the drive instruction and the display effect of the virtual roles.

The multimodal output layer is used for converting the drive instruction into various types of output forms such as expressions, gestures and speech of the virtual role. The multimodal output layer may be connected to multiple output interfaces of the virtual role and may decompose the drive instruction into commands corresponding to different output forms and send the commands to different output interfaces to obtain the display effect of the virtual role, where the display effect is the actions such as expressions and gestures made by the virtual role and the speech outputted by the virtual role.

In this embodiment, the multimodal output layer converts the drive instruction into multiple display effects of the virtual role so that the output forms are more diversified and the user can more intuitively and clearly acquire information through the control display and the guidance of the virtual role, thereby improving the user experience.

Figure 2:
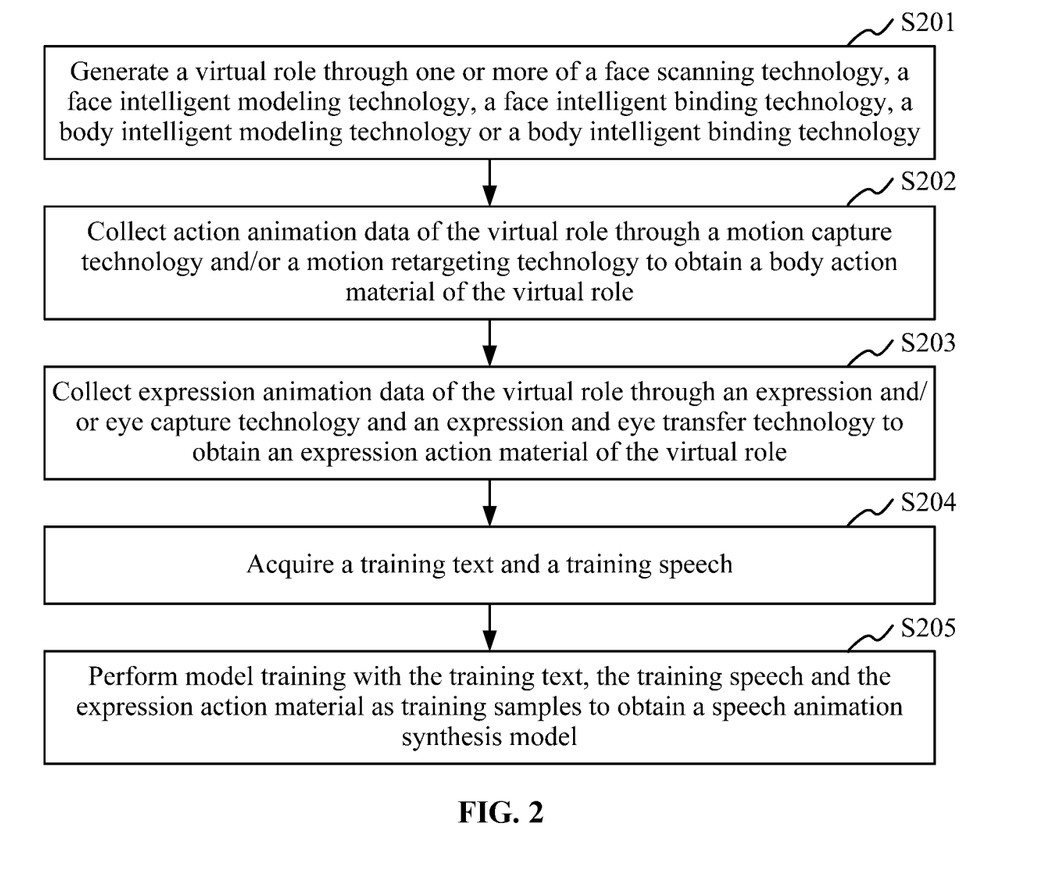
FIG. 2 is a flowchart of the generation of a virtual role and a material library thereof according to an embodiment of the present disclosure.

In an embodiment, with reference to FIG. 2, the generation of the virtual role and the material library thereof includes step S201 to S205.

In step S201, the virtual role is generated through one or more of a face scanning technology, a face intelligent modeling technology, a face intelligent binding technology, a body intelligent modeling technology or a body intelligent binding technology.

The form of the virtual role and its corresponding material library may be produced offline. Different types of high-quality virtual roles may be produced according to different requirements through the core technologies such as face scanning, face intelligent modeling, face intelligent binding, body intelligent modeling and body intelligent binding, and these virtual roles include, for example, super-realistic virtual roles, beautiful virtual roles, cartoon virtual roles and two-dimensional virtual roles. In addition, the produced virtual roles also support various forms of customization such as clothing customization, hairstyle customization and makeup customization, and the customization may be dynamically adjusted according to requirements.

In step S202, action animation data of the virtual role is collected through a motion capture technology and/or a motion retargeting technology to obtain a body action material of the virtual role.

In step S203, expression animation data of the virtual role is collected through an expression and/or eye capture technology and an expression and eye transfer technology to obtain an expression action material of the virtual role.

The material library of the virtual role includes several body action materials and expression action materials, and the animation data of the body action of the virtual role is collected through the (body and/or gesture) motion capture technology and the motion retargeting technology and is used for producing rich body action materials of the virtual role. The expression animation data of the virtual role is collected through the expression and eye capture technology and the expression and eye transfer technology to obtain the expression action material of the virtual role.

In step S204, a training text and a training speech are acquired.

High-quality audio data is acquired through the high-quality audio acquisition technology and then is used as the training speech material of the virtual role, that is, the training speech. The training text is a text data template for model training.

In step S205, model training is performed with the training text, the training speech and the expression action material as training samples to obtain a speech animation synthesis model.

Finally, the corresponding speech animation synthesis model is trained using text-to-speech and animation technologies. For example, the speech animation synthesis model may be a text-to-speech and animation (TTSA) model. The training speech is associated with the expression action material of the virtual role, the expression action may be acquired through the model from the expression action material of the virtual role based on the text inputted into the model, and the speech corresponding to the inputted text may be generated.

It is to be noted that in addition to the intelligent virtual role production method, the traditional animation audio data production method and the combination of an AI performance animation production method and a traditional animation production method may also be used for producing the virtual role.

Optionally, the method may further include the production of the virtual material, and some virtual materials including virtual scenes, virtual special effects, virtual props and widget controls may be produced offline.

In this embodiment, the virtual role and the material library thereof may be generated offline before the platform executes the virtual role-based multimodal interaction method, and when the platform executes the steps in FIG. 1 and the multimodal virtual content is displayed, the virtual role can make expression actions and/or body actions highly aligned with the sound when the virtual role outputs speech so that the virtual role can speak as naturally as a real person, improving the intelligence and realism of the virtual role.

In an embodiment, with continued reference to FIG. 1, the step where the multimodal virtual content is acquired according to the drive instruction includes: an output speech and/or an expression action corresponding to the virtual role are acquired based on the output text through the speech animation synthesis model.

After the virtual role, its material library and the TTSA model are generated through the steps in FIG. 2, according to the output text, the virtual role may be called, the expression action to be displayed may be acquired from the expression action material, and the output speech corresponding to the output text may be generated. In this manner, the virtual content of the virtual role is acquired.

Optionally, the acquired output speech and/or expression action corresponding to the virtual role is animated and synthesized to obtain the animation data of the expression and/or speech.

Further, the acquired expression action of the virtual role includes a lip shape. The expression action includes information such as expressions, eyes and lip shapes and may also include information such as the smiling expression and the helplessness expression.

It is to be noted that when the virtual content of the virtual role is acquired according to the drive instruction, the virtual content may also be generated (or acquired) based on other commonly used technologies except the TTSA model, and the details are not repeated here.

Figure 3:
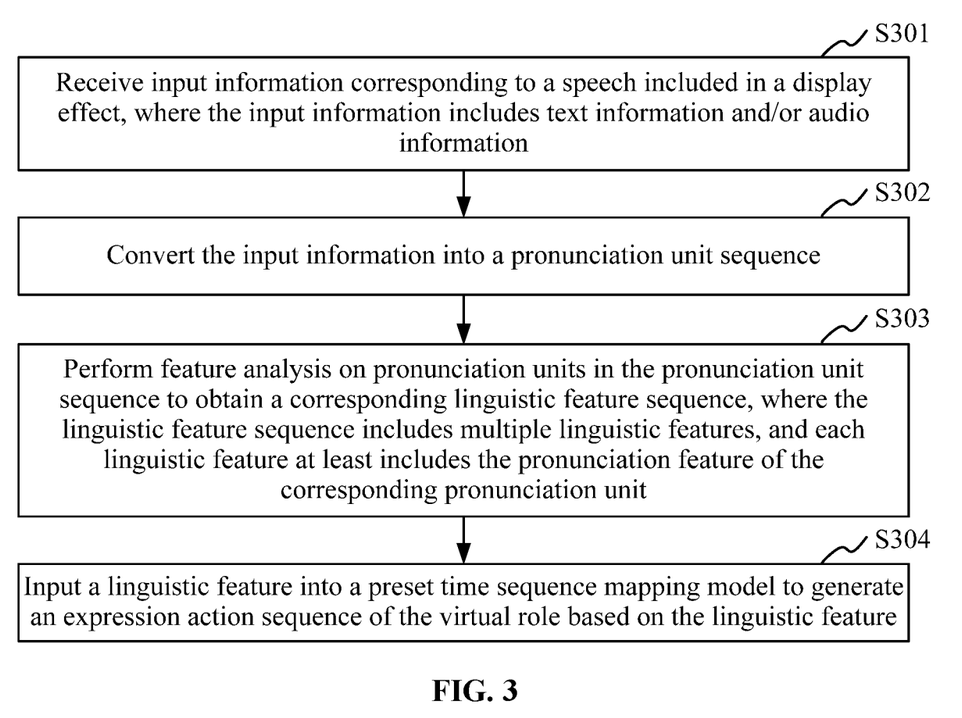
FIG. 3 is a flowchart of a method for constructing the relationship between the expression and/or the lip shape of a virtual role and the outputted speech according to an embodiment of the present disclosure.

With reference to FIG. 3, FIG. 3 provides a method for constructing the relationship between the expression and/or the lip shape of the virtual role and the outputted speech, that is, the relationship between the expression and/or the lip shape of the virtual role and the outputted speech in the TTSA model may be configured based on the steps S301 to S304.

In step 301, input information corresponding to a speech included in a display effect is received, where the input information includes text information and/or audio information.

The input information may be audio information or text information which has been collected or recorded in advance, and the input information may be divided into a pronunciation unit sequence composed of minimum pronunciation units and is used as the data basis for the subsequent linguistic feature analysis. Further, the text information may be expressed in the form of text such as words, characters, pinyin and phonemes.

The speech to be outputted of the display effect may be directly used as the input information, and may also be converted into text information and then used as the input information.

In step S302, the input information is converted into a pronunciation unit sequence.

When the input information is audio information, the text information may be extracted from the audio information based on the automatic speech recognition (ASR) technology. Further, the input information is converted into the pronunciation unit sequence based on a preset pronunciation dictionary. When the input information is text information, the basic pronunciation units in the text information may be extracted based on the front-end module in the text-to-speech (TTS) technology so that the text information is converted into the pronunciation unit sequence.

It is to be noted that other methods for converting the text information or audio information into the corresponding pronunciation unit sequence may be used to implement the preceding step, and other methods may not be enumerated here.

In step S303, feature analysis is performed on the pronunciation units in the pronunciation unit sequence to obtain a corresponding linguistic feature sequence, where the linguistic feature sequence includes multiple linguistic features, and each linguistic feature at least includes the pronunciation feature of the corresponding pronunciation unit.

After the pronunciation unit sequence is acquired, linguistic feature analysis may be performed to obtain the linguistic feature sequence. The linguistic feature may be used for characterizing the pronunciation feature of the pronunciation unit. For example, the pronunciation feature includes, but is not limited to, whether the pronunciation unit is an alveolar nasal or a velar nasal, whether the pronunciation unit is a monophthong or a diphthong, whether the pronunciation unit is an aspirated sound or a non-aspirated sound, whether the pronunciation unit is a friction sound, and whether the pronunciation unit is a tongue sharp sound.

In step S304, a linguistic feature is inputted into a preset time sequence mapping model to generate an expression action sequence of the virtual role based on the linguistic feature.

The preset time sequence mapping model is trained and constructed based on the deep learning technology, then the input linguistic feature sequence is mapped to the expression parameter of the corresponding virtual role based on the preset time sequence mapping model, and the model may convert the inputted linguistic feature sequence into the expression action sequence corresponding to the virtual role.

The expression and/or lip shape of the virtual role in the outputted animation data may be generated as the expression action sequence of the virtual role corresponding to the output speech through the multimodal output layer to generate the animation data.

Optionally, when the multimodal output layer drives the display and output of the multimodal virtual content based on the drive instruction, other action drive logic may be set in addition to the action drive logic constructed according to the preceding TTSA technology.

In an embodiment, with continued reference to FIG. 1, the step S104 where the multimodal virtual content is acquired according to the drive instruction further includes: a body action corresponding to the virtual role is acquired from the body action material based on the output text.

The virtual content of the virtual role may also include a body action, and the body action of the virtual role may also be acquired based on the output text. Optionally, the output text may be set to call the body action material to obtain the corresponding relationship of the body action to obtain the text-based action driving technology.

Optionally, the acquired body action corresponding to the virtual role is animated and synthesized to obtain the animation data of the body action.

In an embodiment, with continued reference to FIG. 1, the step S103 where the multimodal virtual content is acquired according to the drive instruction further includes: one or more of a virtual scene, a virtual information control, a virtual special effect or a virtual prop is acquired based on the display instruction.

After the virtual content other than the virtual role is acquired, the content may be added to the animation data of the virtual role to improve the visual effect when the animation data is displayed.

In an embodiment, with continued reference to FIG. 1, the step S104 where the acquired multimodal virtual content is outputted includes: animation data is generated according to the acquired multimodal virtual content, and the animation data is outputted according to a time sequence with speech content as a timeline.

Optionally, the step where the multimodal virtual content in the animation data is generated according to the acquired multimodal virtual content includes: an output speech and/or an expression action corresponding to the virtual role are acquired based on the output text through the speech animation synthesis model, and one or more of a virtual scene, a virtual information control, a virtual special effect or a virtual prop is acquired based on the display instruction. Specifically, the acquired expression action of the virtual role includes an expression and/or a lip shape. That is, the acquired output speech and expression action are synthesized to obtain the animation data. The output order of the generated animation data is determined with the content of the acquired output speech as a timeline.

Optionally, the acquired multimodal virtual content further includes the body action corresponding to the virtual role acquired from the body action material based on the output text. Specifically, the step where the multimodal virtual content in the animation data is generated according to the acquired multimodal virtual content includes: an output speech and/or an expression action corresponding to the virtual role are acquired based on the output text through the speech animation synthesis model, a body action corresponding to the virtual role is acquired from the body action material based on the output text, and one or more of a virtual scene, a virtual information control, a virtual special effect or a virtual prop is acquired based on the display instruction. Specifically, the acquired expression action of the virtual role includes a lip shape. That is, the acquired body action is synthesized with the output speech and the expression action to obtain the animation data. The output order of the generated animation data is determined with the content of the acquired output speech as a timeline. In an embodiment, after the animation data is generated according to the acquired multimodal virtual content, the method further includes: real-time resolving and/or real-time rendering are performed on the animation data to obtain a video and output the video.

After the animation data is obtained, real-time resolving and real-time rendering are performed on the animation data to obtain a playable video and output the playable video.

Optionally, the simulation of a physical behavior of an object in a real scene is performed on the animation data through a resolving algorithm.

The simulation is performed on the animation data through the resolving algorithm such that the effect of the animation data is close to the effect of the real scene, such as the hair or clothes of the virtual role, and the dynamic effect conforming to the motion law of the real scene is simulated using a dynamic resolving, thereby greatly enhancing the animation output effect of the virtual human.

When the multimodal output layer outputs the animation data, every frame image of the outputted animation data is solved and rendered in real time through the resolving technology and rendering technology of a real-time engine, and in the virtual high-quality 3D scene, the virtual role may express itself through eyes, expressions, actions and conversations, thereby achieving realistic real-time communication effects.

The output device for playing the animation data may be a smart screen, a virtual reality (VR)/augmented reality (AR) device, a smart speaker, a holographic screen, a mobile phone or other functional terminals. The playing page of the animation data may also be nested in mobile apps, WeChat official accounts, mini apps and other applications.

Figure 4:
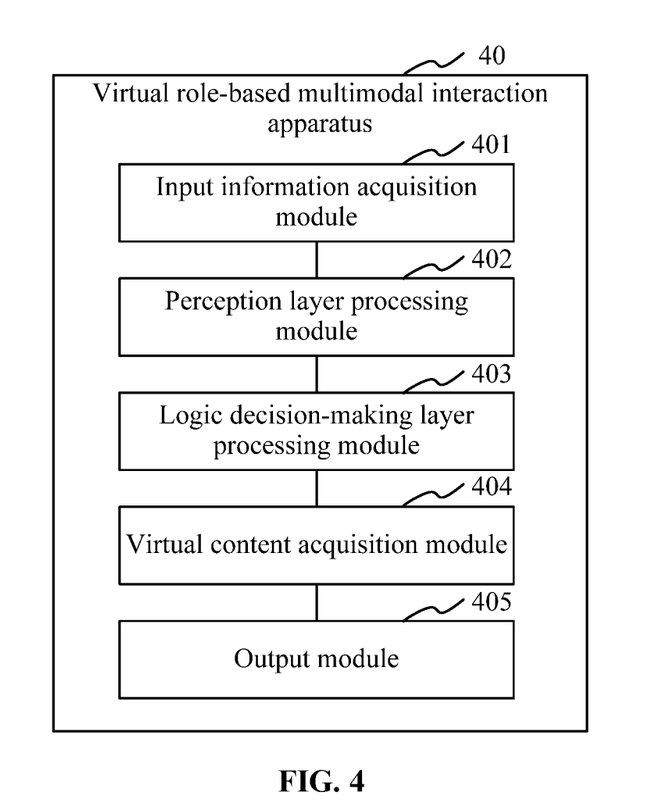
FIG. 4 is a structure diagram of a virtual role-based multimodal interaction apparatus according to an embodiment of the present disclosure.

With reference to FIG. 4, the embodiments of the present disclosure further provide a virtual role-based multimodal interaction apparatus 40. The virtual role-based multimodal interaction apparatus 40 includes an input information acquisition module 401, a perception layer processing module 402, a logic decision-making layer processing module 403, a virtual content acquisition module 404 and an output module 405.

The input information acquisition module 401 is configured to acquire input information, where the input information includes one or more data types.

The perception layer processing module 402 is configured to input the input information into a perception layer to enable the perception layer to recognize and process the input information according to the data type of the input information to obtain a recognition result.

The logic decision-making layer processing module 403 is configured to input the recognition result into a logic decision-making layer to enable the logic decision-making layer to process the recognition result and generate a drive instruction corresponding to the recognition result.

The virtual content acquisition module 404 is configured to acquire multimodal virtual content according to the drive instruction, where the multimodal virtual content includes at least a virtual role.

The output module 405 is configured to output the acquired multimodal virtual content.

In an embodiment, the logic decision-making layer includes a logic decision-making model, the logic decision-making model is trained based on training samples, the training samples are samples of the recognition result and samples of the drive instruction, and the training samples include a training set and a test set.

Optionally, the multimodal virtual content further includes one or more of a virtual scene, a virtual information control, a virtual special effect or a virtual prop.

Optionally, the input information at least includes text data, audio data and image data.

Optionally, the logic decision-making layer performs information recognition on the input information through one or more of a speech recognition processing technology, a text recognition technology or an image recognition technology.

In an embodiment, when the perception layer performs information recognition on the input information through the speech recognition processing technology, the audio data in the input information is inputted into a speech recognition model to obtain a corresponding recognition result.

In an embodiment, when the perception layer performs information recognition on the input information through the image recognition processing technology, at least face information, gesture information, facial expression information, facial emotion information and an object type included in an image in the image data of the input information are recognized.

In an embodiment, the recognition result is semantic information corresponding to various data types, and the logic decision-making layer processing module 403 is further configured to input the semantic information corresponding to various data types into a natural language conversational system to obtain the drive instruction.

In an embodiment, the multimodal virtual content includes virtual content of the virtual role and other virtual content other than the virtual role, and the virtual role-based multimodal interaction apparatus 40 further includes a routing module processing module.

The outing module processing module is configured to acquire an output text and/or a display instruction from the drive instruction through a routing module, where the output text is used for acquiring the virtual content of the virtual role, and the display instruction is used for acquiring the other virtual content other than the virtual role.

In an embodiment, the virtual role-based multimodal interaction apparatus 40 may further include a virtual role generation module, a body action material generation module, an expression action material generation module, a training material acquisition module and a speech animation synthesis model generation module.

The virtual role generation module is configured to generate the virtual role through one or more of a face scanning technology, a face intelligent modeling technology, a face intelligent binding technology, a body intelligent modeling technology or a body intelligent binding technology.

The body action material generation module is configured to collect action animation data of the virtual role a motion capture technology and/or a motion retargeting technology to obtain a body action material of the virtual role.

The expression action material generation module is configured to collect expression animation data of the virtual role through an expression and/or eye capture technology and an expression and eye transfer technology to obtain an expression action material of the virtual role.

The training material acquisition module is configured to acquire a training text and a training speech.

The speech animation synthesis model generation module is configured to perform model training with the training text, the training speech and the expression action material as training samples to obtain a speech animation synthesis model.

In an embodiment, the virtual content acquisition module 404 is further configured to acquire an output speech and/or an expression action corresponding to the virtual role based on the output text through the speech animation synthesis model.

Optionally, the expression action of the virtual role includes a lip shape.

In an embodiment, the virtual content acquisition module 404 is further configured to acquire a body action corresponding to the virtual role from the body action material based on the output text.

In an embodiment, the virtual content acquisition module 404 is further configured to acquire one or more of a virtual scene, a virtual information control, a virtual special effect or a virtual prop based on the display instruction.

In an embodiment, the output module 405 includes an animation generation unit and an output unit. The animation generation unit is configured to generate animation data according to the acquired multimodal virtual content. The output unit is configured to output the animation data according to a time sequence with speech content as a timeline.

In an embodiment, the output module 405 is further configured to perform real-time resolving and/or real-time rendering on the animation data to obtain a video and output the video.

Optionally, the output module 405 is further configured to perform the simulation of a physical behavior of an object in a real scene on the animation data through a resolving algorithm.

For more content on the working principle and working mode of the virtual role-based multimodal interaction apparatus, reference may be made to the related description of the virtual role-based multimodal interaction method in FIGS. 1 to 3, and the details are not repeated here.

Figure 5:
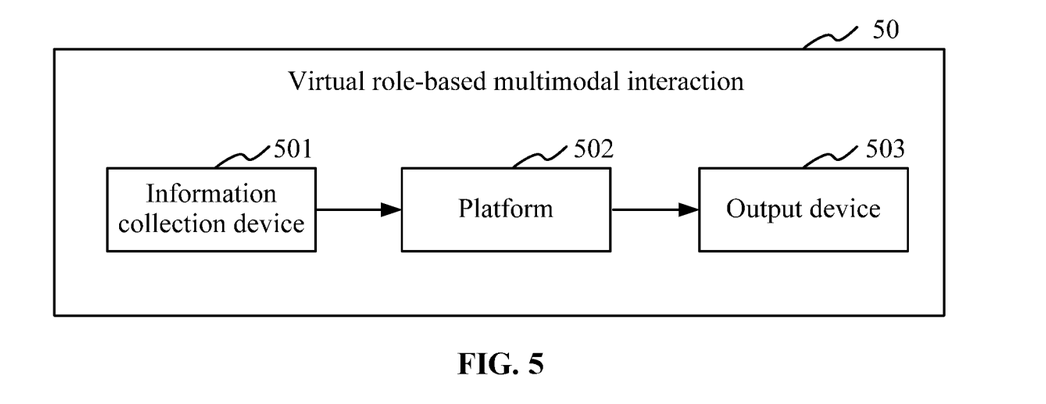
FIG. 5 is a structure diagram of a virtual role-based multimodal interaction system according to an embodiment of the present disclosure.

With reference to FIG. 5, the embodiments of the present disclosure further provide a virtual role-based multimodal interaction system 50. The system includes an information collection device 501, a platform 502 and an output device 503.

The information collection device 501 is configured to collect external data to obtain input information.

The platform 502 is configured to perform the steps of the virtual role-based multimodal interaction method in FIGS. 1 to 3.

The output device 503 is configured to display outputted multimodal virtual content.

Figure 6:
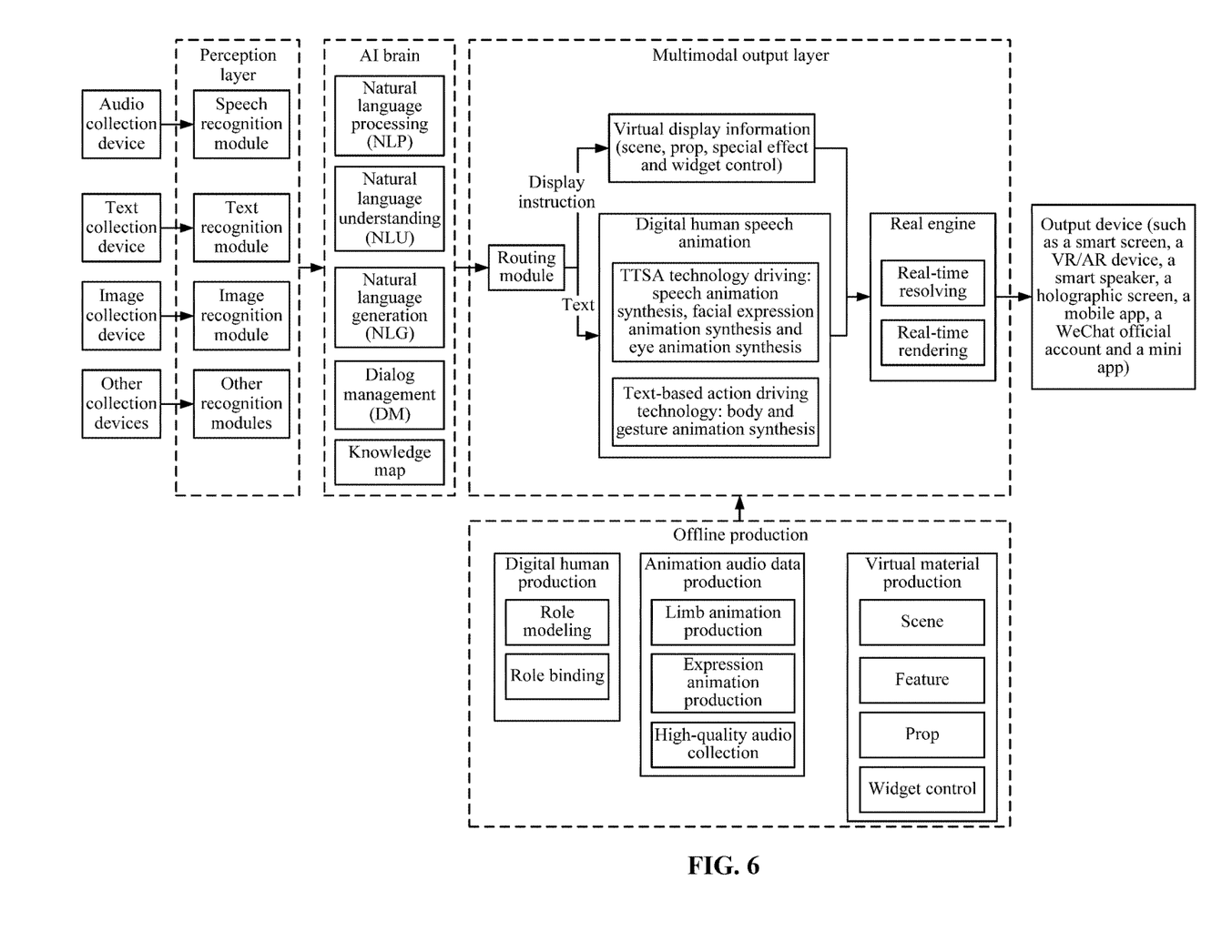
FIG. 6 is another structure diagram of a virtual role-based multimodal interaction system according to an embodiment of the present disclosure.

In another embodiment, with reference to FIGS. 5 and 6, the information collection device 501 may be divided into an audio collection device, a text collection device, an image collection device and other collection devices based on the data types of the input information. Each collection device may interface with different recognition modules in the perception layer in the platform 502. For example, the audio collection device sends the collected audio data to the speech recognition module, the text collection device sends the acquired text data to the text recognition module, and the image collection device sends the acquired image data to the image recognition module. The perception layer in the platform 502 may also be provided with other recognition modules to recognize the data collected by the other collection devices.

The platform 502 may also include an AI brain region, that is, a logic decision-making layer herein, and such a region may include a natural language conversational system and specifically includes NLP, NLU, NLG, DM and a knowledge map. The AI brain region is configured to generate a drive instruction based on the recognition result of the input information.

The platform 502 further includes a routing module configured to acquire an output text and a display instruction from the drive instruction and subsequently forward the output text and the display instruction to different modules. Specifically, the routing module forwards the display instruction to a module corresponding to virtual display information to acquire the currently outputted scene, prop, special effect and widget control. The routing module may also forward the output text to a module for generating the digital human speech animation. The module for generating the digital human speech animation may synthesize a digital human speech based on the TTSA model, synthesize a facial expression and eye animation, and also synthesize a body and gesture animation based on the text-based action driving technology.

The animation data to be outputted is generated based on the acquired scene, prop, special effect and widget control currently outputted as well as the synthesized digital human speech, the synthesized facial expression and eye animation and the synthesized body and gesture animation, the animation data is sent to a real-time engine, and the real-time engine performs real-time resolving and real-time rendering on the animation data and then outputs the obtained animation data.

An appropriate output device 503 is selected to output the animation data, such as a smart screen, a VR/AR device, a smart speaker, a holographic screen, a mobile app, a WeChat official account and a mini app. The routing module, the module corresponding to the virtual display information, the module for generating the digital human speech animation and the real-time engine form the multimodal output layer of the platform 502.

The platform 502 may also include a module for offline production. The module may include portions such as virtual digital human production, animation audio data production and virtual material production, where the virtual digital human production completes role modeling and role binding of the virtual digital human, the animation audio data production completes limb animation production, expression animation production and high-quality audio collection, and the virtual material production completes the production of virtual scenes, features, props and widget controls.

For more content on the working principle and working mode of the virtual role-based multimodal interaction system in FIGS. 5 and 6, reference may be made to the related description of the virtual role-based multimodal interaction method in FIGS. 1 to 3, and the details are not repeated here.

Compared with the smart voice assistant and the 2D image digital human assistant, the main improvements in support of multimodality provided by the embodiments of the present disclosure include the following.

(1) Upgrade of user interaction experience: The conventional intelligent assistant performs interaction through text and speech and has problems of poor interaction experience and low information selection efficiency. The multimodal virtual role may interact with users through speech, actions, expressions, etc., and is displayed in various presentation forms such as pictures, texts and videos. The original 2D interaction experience is upgraded to the virtual 3D interaction experience through the presentation forms of the multimodal output, thereby improving the visual effect of users.

(2) Improvement of the information acquisition efficiency of users: The existing information interaction carriers, such as browsers and apps, all enable users to obtain information by recommending information flows. Generally, users need to filter appropriate information by themselves from a wide range of information, and such an information interaction mode is inefficient. The multimodal virtual role can accurately acquire information through the analysis of the logic decision-making layer and the multimodal output of the virtual role. In addition, the information acquisition efficiency of users is greatly improved through various content display and friendly information guidance.

(3) The virtual role and its material library can be generated offline before the platform executes the virtual role-based multimodal interaction method, and when the platform displays the multimodal virtual content, the virtual role can make expression actions and/or body actions highly aligned with the sound when the virtual role outputs speech. Compared with the conventional virtual assistant, after real-time resolving and 3D rendering are performed on the virtual role, the virtual role in the embodiments of the present disclosure has a better display effect and can speak naturally as a real person, thereby improving intelligence and realism of the virtual role.

Further, the embodiments of the present disclosure further provide a storage medium having a computer program stored thereon, where the computer program, when executed by a processor, performs the technical solutions of the method in FIGS. 1 to 3.

Further, the embodiments of the present disclosure further provide a terminal including a memory and a processor. The memory is configured to store a computer program executable on the processor, and the processor, when executing the computer program, performs the technical solutions of the method in FIGS. 1 to 3.

Specifically, in the embodiments of the present disclosure, the processor may be a central processing unit (CPU), and the processor may also be another general-purpose processor, a digital signal processor (DSP), an application-specific integrated circuit (ASIC), a field-programmable gate array (FPGA) or other programmable logic devices, a discrete gate or a transistor logic device, or a discrete hardware component. The general-purpose processor may be a microprocessor or any conventional processor.

It is to be understood that the memory in the embodiments of the present application may be a volatile memory or a non-volatile memory, or may include both the volatile memory and the non-volatile memory. The non-volatile memory may be a read-only memory (ROM), a programmable ROM (PROM), an erasable PROM (EPROM), an electrically EPROM (EEPROM) or a flash memory. The volatile memory may be a random-access memory (RAM) which serves as an external cache. By way of an illustrative description rather than a limited description, many forms of RAMs may be used, such as a static RAM (SRAM), a dynamic RAM (DRAM), a synchronous DRAM (SDRAM), a double data rate SDRAM (DDR SDRAM), an enhanced SDRAM (ESDRAM), a synclink DRAM (SLDRAM) and a direct Rambus RAM (DRRAM).

It is to be understood that the term "and/or" herein is used for describing an association between associated objects and indicates three relations. For example, "A and/or B" may indicate the presence of A alone, the presence of both A and B, and the presence of B alone. In addition, the character "/" herein indicates an "or" relation between associated objects.

"A plurality of" or "multiple" in the embodiments of the present application means two or more. "First", "second", etc., in the embodiments of the present application are for illustrating and distinguishing objects and not for describing a particular sequence, do not indicate any special limitation on the number of devices in the embodiments of the present application, and cannot be construed as limiting the embodiments of the present application.

The "connection" in the embodiments of the present application refers to various connection methods such as direct connection or indirect connection to achieve communication between devices, and the embodiments of the present application are not limited thereto.

Although the present disclosure is as described above, the present disclosure is not limited thereto. Any person skilled in the art may make any modifications and changes without departing from the spirit and scope of the present disclosure, and thus the scope of the present disclosure is intended to be limited by the appended claims.

What is claimed is:

1. A virtual role-based multimodal interaction method, comprising:
acquiring input information, wherein the input information comprises one or more data types;
inputting the input information into a perception layer to enable the perception layer to recognize and process the input information according to a data type of the input information to obtain a recognition result;
inputting the recognition result into a logic decision-making layer to enable the logic decision-making layer to process the recognition result and generate a drive instruction corresponding to the recognition result;
acquiring multimodal virtual content according to the drive instruction, wherein the multimodal virtual content at least comprises a virtual role; and
outputting the acquired multimodal virtual content;
wherein the logic decision-making layer comprises a logic decision-making model, the logic decision-making model is trained based on training samples, the training samples are samples of the recognition result and samples of the drive instruction, and the training samples comprise a training set and a test set.

2. The method of claim 1, wherein the multimodal virtual content further comprises one or more of a virtual scene, a virtual information control, a virtual special effect or a virtual prop.

3. The method of claim 1, wherein the input information at least comprises text data, audio data and image data.

4. The method of claim 3, wherein the perception layer performs information recognition on the input information through one or more of a speech recognition processing technology, a text recognition technology or an image recognition technology.

5. The method of claim 4, further comprising: when the perception layer performs information recognition on the input information through the speech recognition processing technology, inputting the audio data in the input information into a speech recognition model to obtain a corresponding recognition result.

6. The method of claim 4, further comprising: when the perception layer performs information recognition on the input information through the image recognition processing technology, at least recognizing face information, gesture information, facial expression information, facial emotion information and an object type comprised in an image in the image data of the input information.

7. The method of claim 4, wherein the recognition result is semantic information corresponding to a plurality of data types, and the inputting the recognition result into the logic decision-making layer to enable the logic decision-making layer to process the recognition result and generate the drive instruction corresponding to the recognition result comprises:
  inputting the semantic information corresponding to the plurality of data types into a natural language conversational system to obtain the drive instruction.

8. The method of claim 7, wherein the multimodal virtual content comprises virtual content of the virtual role and other virtual content other than the virtual role, and after the drive instruction is obtained, the method further comprises:
  acquiring at least one of an output text or a display instruction from the drive instruction through a routing module;
  wherein the output text is used for acquiring the virtual content of the virtual role, and the display instruction is used for acquiring the other virtual content other than the virtual role.

9. The method of claim 8, further comprising: generation of the virtual role and a material library, comprising:
  generating the virtual role through one or more of a face scanning technology, a face intelligent modeling technology, a face intelligent binding technology, a body intelligent modeling technology or a body intelligent binding technology;
  collecting action animation data of the virtual role through at least one of a motion capture technology or a motion retargeting technology to obtain a body action material of the virtual role;
  collecting expression animation data of the virtual role through at least one of an expression or eye capture technology and an expression and eye transfer technology to obtain an expression action material of the virtual role;
  acquiring a training text and a training speech; and
  performing model training with the training text, the training speech and the expression action material as training samples to obtain a speech animation synthesis model.

10. The method of claim 9, wherein the acquiring multimodal virtual content according to the drive instruction comprises:
  acquiring at least one of an output speech or an expression action corresponding to the virtual role through the speech animation synthesis model based on the output text.

11. The method of claim 10, wherein the expression action of the virtual role comprises a lip shape.

12. The method of claim 9, wherein the acquiring multimodal virtual content according to the drive instruction further comprises:
  acquiring a body action corresponding to the virtual role from the body action material based on the output text.

13. The method of claim 9, wherein the acquiring multimodal virtual content according to the drive instruction further comprises:
  acquiring one or more of a virtual scene, a virtual information control, a virtual special effect or a virtual prop based on the display instruction.

14. The method of claim 10, wherein the outputting the acquired multimodal virtual content comprises:
  generating animation data according to the acquired multimodal virtual content, and outputting the animation data according to a time sequence with speech content as a timeline.

15. The method of claim 14, after the generating animation data according to the acquired multimodal virtual content, further comprising:
  performing at least one of real-time resolving or real-time rendering on the animation data to obtain a video and output the video.

16. The method of claim 15, further comprising: performing simulation of a physical behavior of an object in a real scene on the animation data through a resolving algorithm.

17. The method of claim 1, wherein the input information is collected by an information collection device, and the information collection device comprises one or more of a text collection device, an image collection device, a sound pick-up device, a temperature sensor or a gyroscope.

18. A storage medium having a non-transitory computer program stored thereon, wherein the computer program, when executed by a processor, performs steps of the method of claim 1.

19. A terminal, comprising a memory and a processor, wherein the memory is configured to store a computer program, and the processor, when executing the computer program, performs steps of the method of claim 1.

20. A virtual role-based multimodal interaction system, comprising: an information collection device, a platform and an output device, wherein the information collection device is configured to collect external data to obtain input information; the platform is configured to perform the method of claim 1; and the output device is configured to display outputted multimodal virtual content.

* * * * *